United States Patent
Baudasse et al.

(10) Patent No.: US 8,939,588 B2
(45) Date of Patent: Jan. 27, 2015

(54) DEVICE FOR PROTECTION OF A MULTIBEAM OPTICAL INSTRUMENT

(75) Inventors: Yannick Baudasse, Grasse (FR); Stéphane Vezain, Mandelieu (FR)

(73) Assignee: Thales, Neuilly sur Seine (FR)

( * ) Notice: Subject to any disclaimer, the term of this patent is extended or adjusted under 35 U.S.C. 154(b) by 380 days.

(21) Appl. No.: 13/464,671

(22) Filed: May 4, 2012

(65) Prior Publication Data

US 2013/0120845 A1    May 16, 2013

(30) Foreign Application Priority Data

May 5, 2011  (FR) ...................................... 11 01385

(51) Int. Cl.
*G02B 27/00* (2006.01)
*B64G 1/22* (2006.01)
*B64G 1/54* (2006.01)
*B64G 1/66* (2006.01)
B64G 1/44 (2006.01)
B64G 1/50 (2006.01)

(52) U.S. Cl.
CPC ................ *G02B 27/00* (2013.01); *B64G 1/222* (2013.01); *B64G 1/54* (2013.01); *B64G 1/66* (2013.01); *B64G 1/44* (2013.01); *B64G 1/503* (2013.01)
USPC .......................... 359/601; 359/399; 244/172.6

(58) Field of Classification Search
None
See application file for complete search history.

(56) References Cited

U.S. PATENT DOCUMENTS

| 4,511,901 | A | * | 4/1985 | Westphal ...................... 343/915 |
| 7,557,995 | B1 | | 7/2009 | Lloyd |
| 7,631,839 | B1 | | 12/2009 | Duncan et al. |
| 8,770,521 | B2 | * | 7/2014 | Baudasse et al. .......... 244/171.6 |
| 2004/0051878 | A1 | | 3/2004 | Rhoads |

FOREIGN PATENT DOCUMENTS

| EP | 1873061 A1 | 1/2008 |
| EP | 2151704 A1 | 2/2010 |

* cited by examiner

*Primary Examiner* — Derek S Chapel
(74) *Attorney, Agent, or Firm* — Baker Hostetler LLP (57) ABSTRACT

A protection device for an optical instrument of a satellite including a body on which the optical instrument is mounted, the optical instrument including a central mirror and peripheral mirrors reflecting light towards the central mirror, said protection device having a folded position and a deployed position, includes a plurality of panels rigid in the deployed position, the device forming a cellular structure including a tube for each peripheral mirror, the section of the tubes being a polygon, the tubes being disposed in such a manner as to protect the peripheral mirrors against stray illumination, and said panels being held against the body of the satellite in the folded position.

8 Claims, 8 Drawing Sheets

DEVICE FOR PROTECTION OF A MULTIBEAM OPTICAL INSTRUMENT

CROSS-REFERENCE TO RELATED APPLICATION

This application claims priority to foreign French patent application No. FR 1101385, filed on May 5, 2011, the disclosure of which is incorporated by reference in its entirety.

FIELD OF THE INVENTION

The invention concerns the field of devices for protection of satellite optical instruments and in particular multibeam optical instruments.

BACKGROUND

Multibeam optical instruments generally include a primary mirror situated in the optical instrument, a central secondary mirror positioned facing the primary mirror, and a plurality of peripheral mirrors reflecting light towards the central secondary mirror. Each of these peripheral mirrors needs to be protected against direct entry of sunlight. Protection prevents optical disturbance and enables regulation of the temperature in the vicinity of the focal planes. This protection assures the optical performance of the instruments.

These instruments mounted on satellites are placed in orbit by launch vehicles. The small volume allocated under the nosecap of the launch vehicle makes it impossible to have a fixed protection device disposed in front of the optical instrument. It is therefore necessary to deploy this protection in flight, before the operational phase.

The technical problems encountered in deploying large structures are principally:

In the stowed configuration: restricted volume for stowing the structure, maintaining the integrity of that structure in the folded configuration, in the face of mechanical and thermal attack caused by launching the spacecraft (notably non-deterioration of the very fragile thermal protection elements).

During deployment: control of deployment in kinematic terms, regulation of speed in order to prevent shocks at the end of deployment.

In the deployed configuration: assuring stability and stiffness in flight in order to guarantee the controllability of the craft and to assure correct positioning of the structure in order to assure the limitation of entry of sunlight and no blocking of the field of view.

Figure 1:
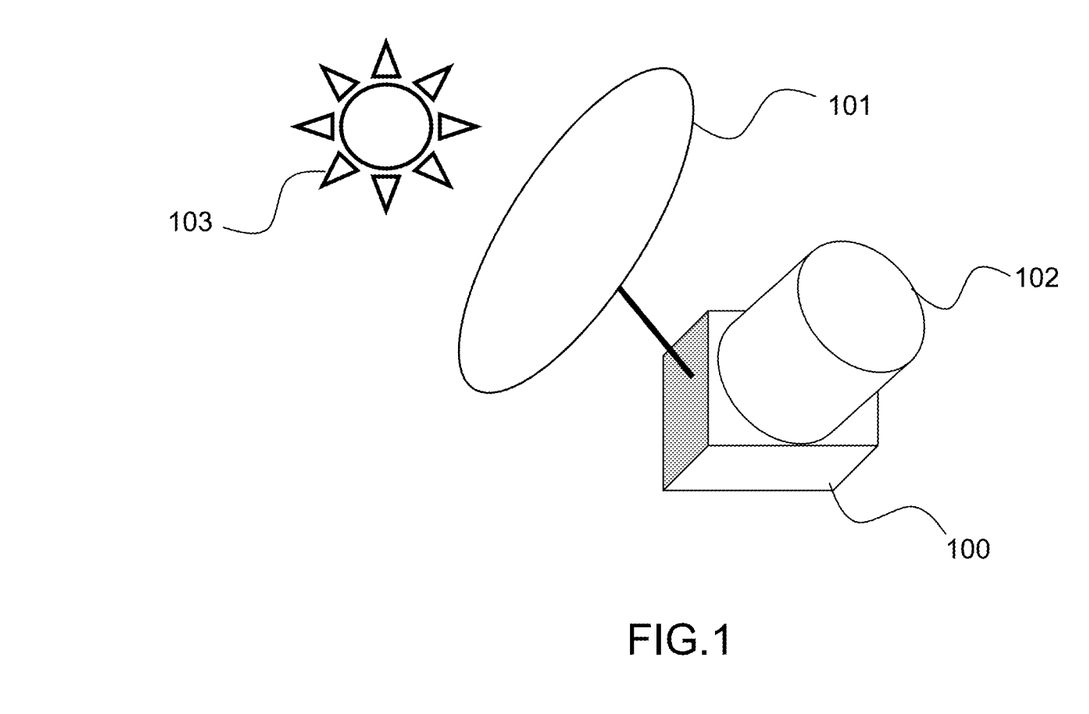
FIG. 1, already described, represents a prior art protection device.

FIG. 1 represents a prior art satellite optical instrument protection device. That device includes a plane solar screen 101 positioned at a certain distance from the satellite 100 in such a manner as to protect the optical instrument against stray light coming from the sun 103. On some missions, the use of a plane screen implies having a rotary element (the solar screen) of large size. This solution also gives rise to problems: reliability problems, attitude orbit control system (AOCS) disturbance problems, problems of disturbance at the optical measurement level, and service life problems resulting from the mechanical elements employed.

Moreover, to prevent entry of sunlight during certain periods, complementary pivoting of the solar screen is necessary, which makes this type of solution more complex.

Thus protection close to the optical beams is a more efficacious solution because it requires no movement throughout the operational phase.

To provide this type of enclosing protection, it is possible to use several technologies based on a deployable support structure retaining and positioning a flexible substrate.

The support structure may be inflatable and stiffenable in flight but control of deployment is complex because it is difficult to model by calculation and complex to test. Moreover, stiffening methods are irreversible and therefore do not enable ground testing of a design intended to fly.

Known already are flexible protection devices based on the use of a flexible cylindrical sheath composed of thermal protection foil. This element is folded on itself during the stowage phase and then deployed and tensioned. This solution has a number of drawbacks. First of all, it is difficult in stowage to prevent deterioration of the membranes constituting the thermal protection blanket. These are very fragile and are sensitive to mechanical attack. The degraded membrane produces dust which, on deployment, is dispersed over the instrument and degrades its optical performance. Moreover, to obtain compact stowage, it is necessary to fold the flexible elements, and this folding is generally irreversible and weakens the membrane. Finally, the energy necessary to tension the flexible element in order to ensure its correct final positioning is difficult to calculate because in this case deployment is not particularly reproducible. This results in an overestimation of the energy needed for tensioning the flexible element in order to ensure its correct final positioning, which may cause deterioration of some components and the membrane.

SUMMARY OF THE INVENTION

The invention aims to alleviate the problems referred to above by proposing a device for protection of an optical instrument of a satellite that is sufficiently compact in the stowed position to enable arrangement of the satellite under the nosecap of a launch vehicle, enables controlled and regulated deployment and, after deployment, offers efficacious protection against unwanted entry of sunlight and sufficient stiffness to enable control of the satellite.

To this end, the invention provides a protection device for an optical instrument of a satellite including a body on which the optical instrument is mounted, the optical instrument including a primary mirror situated in the optical instrument, a central secondary mirror positioned facing the primary mirror, and a plurality of peripheral mirrors reflecting light towards the central secondary mirror, said protection device having a folded position and a deployed position, characterized in that it includes a plurality of panels rigid in the deployed position, the device forming a cellular structure including a tube for each peripheral mirror, the section of the tubes being a polygon, the tubes being disposed in such a manner as to protect the peripheral mirrors against stray illumination, and said panels being held against the body of the satellite in the folded position.

The protection device advantageously further includes means for retaining the panels in the folded position.

The retaining means advantageously include tie-rods disposed for each of the cells on one of the panels of the cell and stacking bases disposed on the satellite body in such a manner as to retain the tie-rods in the folded position.

The protection device advantageously further includes solar panels fixed to the panels by means of articulations, in such a manner as to be held against the panels in the folded position and to be perpendicular to the longitudinal axis of the tube in the deployed position.

In one embodiment the panels are solid.

In another embodiment the panels include a rigid frame to which is fixed a taut membrane.

The protection panels advantageously include active and passive control elements positioned directly on their surface, the device having a thermal control function.

The solution of the invention employs rigid elements the technical characteristics of which are perfectly known, controlled and reproducible. This solution enables compact and rigid stowage of a deployable device of polygonal shape that can be as much as several tens of meters long.

BRIEF DESCRIPTION OF THE DRAWINGS

The invention will be better understood and other advantages will become apparent on reading the detailed description given by way of nonlimiting example and with reference to the drawings, in which.

DETAILED DESCRIPTION

FIGS. 2a to 2e represent the steps of deploying a device of one embodiment of the invention. The protection device of this embodiment of the invention employs articulated panels forming, in the deployed position, an array of six hexagonal tubes. Each hexagon is composed of six panels of which one is shared with the body of the satellite and the other five are interconnected by simple or self-propelled articulations.

The panels common to the body of each cell include interstices enabling light to pass from the peripheral mirrors towards the central secondary mirror.

The connections between panels enable a closed structure to be obtained and thus assure an overall rigidity of the assembly as well as a perfect barrier to entry of sunlight.

Each cell includes a panel shared with each of the adjacent cells.

FIGS. 2a to 2e represent the steps of deploying a device of one embodiment of the invention. In the remainder of the description, the panels 201 connected directly to the body 200 of the satellite are called first panels. Note that there are as many first panels as the body of the satellite has faces (and therefore peripheral mirrors), i.e. six in the present example.

The first panels 201 are connected to the body 200 of the satellites by self-propelled articulations 202 called first articulations.

The panels 203 connected to the first panels are called second panels. Each first panel 201 is connected to two second panels 203 by two different articulations. One articulation 204 is self-propelled and the other articulation 205 is free to rotate throughout deployment.

The self-propelled articulations 204 connecting the first panels 201 to the second panels 203 are called second articulations.

Figure 2A:
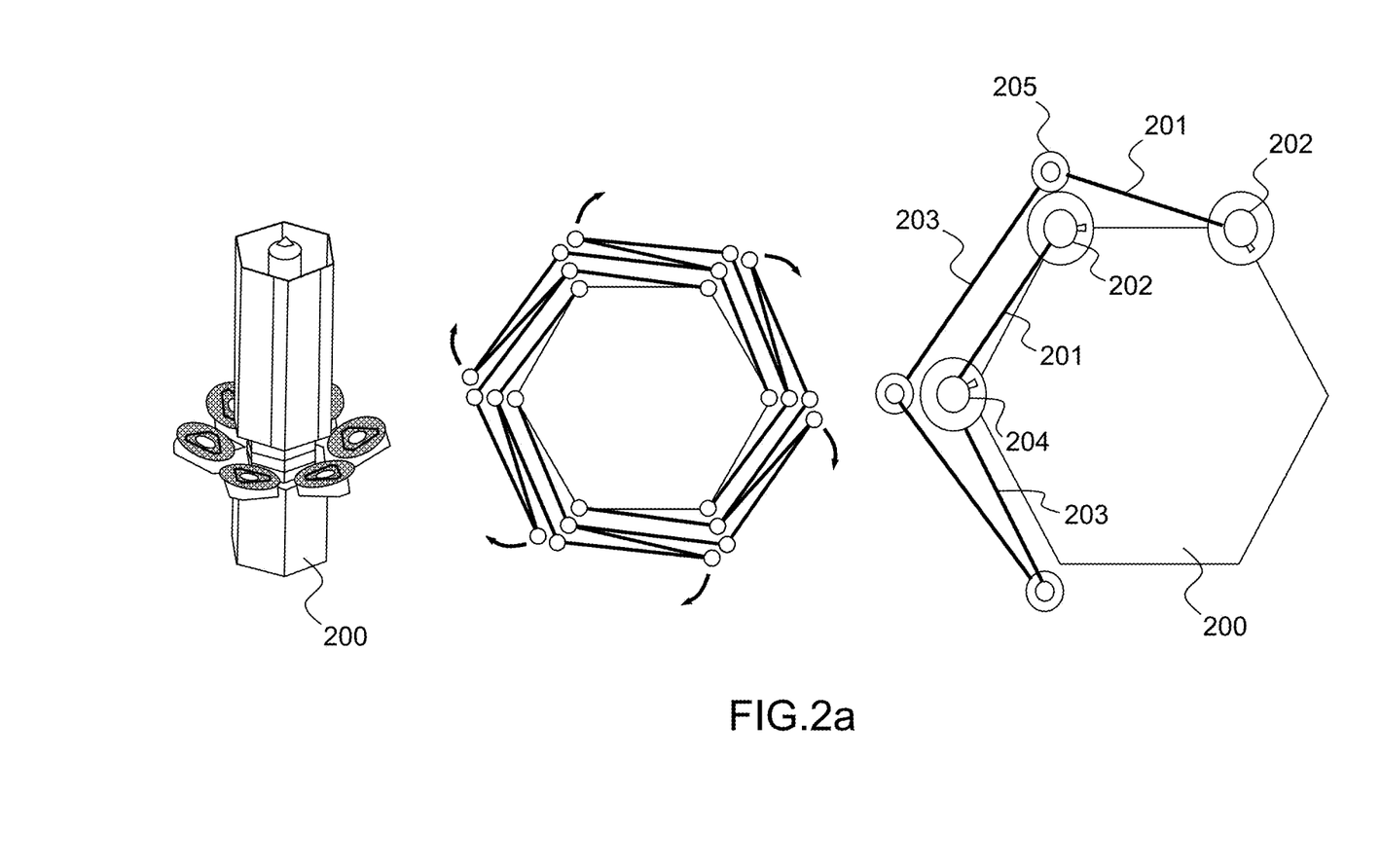
FIGS. 2a to 2e represent the steps of deploying a device of one embodiment of the invention.

FIG. 2a represents the protection device of the invention in the stowed position in perspective, a first view from above and a simplified second view from above showing a single cell.

At the beginning of deployment, the first articulations 202 are inert. The second articulations 204 are active. The action of each of the second articulations 204 has the effect of causing rotation of each of the second panels 203 relative to the first panels 201 about each of these second articulations 204.

The other articulations are free to rotate. These articulations remain free to rotate throughout deployment.

They rotate about axes parallel to the longitudinal axes of the tubes.

Figure 2B:
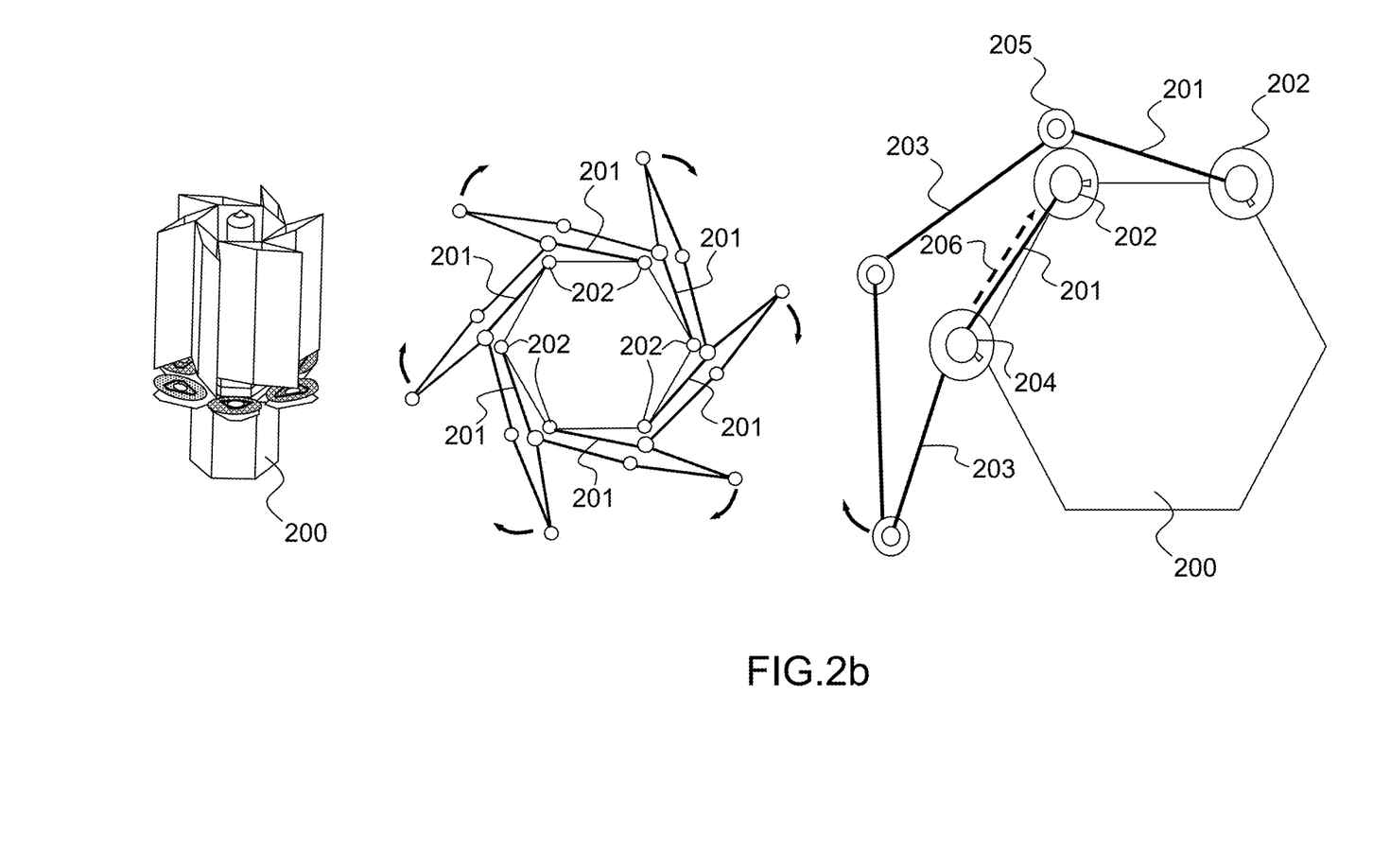

FIG. 2b represents the protection device of the invention during a first intermediate deployment step in perspective, a first view from above and a simplified second view from above showing a single cell.

This figure shows a sequencing mechanism 206 for triggering the driving of the first articulations 202. The sequencing mechanism is operative when the rotation of the second panels 203 is sufficiently advanced and their position enables deployment of the other panels. In the example shown in the figure, the sequencing mechanism 206 triggers the driving of the first articulations when the second panels 203 are in line with the first panels 201 to which they are connected. The articulations between them may be driven by means of a system of cables and pulleys. This system associated with pulleys of variable shape (cams), or retractable abutments, also enables synchronization (advanced/retard) or sequencing of the opening of the various panels relative to each other.

Figure 2C:
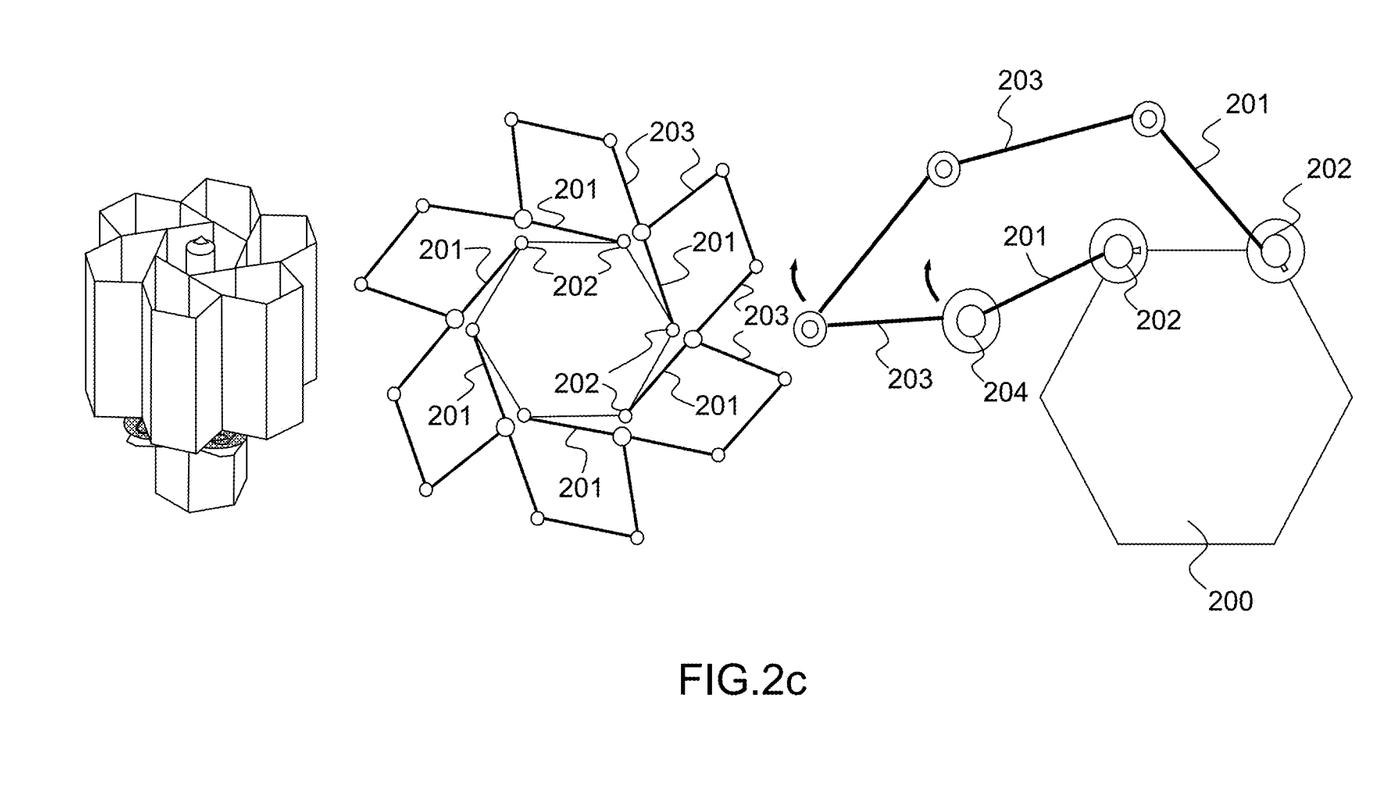

FIG. 2c represents the protection device of the invention during a second intermediate deployment step in perspective, a first view from above and a simplified second view from above showing a single cell.

This figure shows the device after activation of the sequencing mechanism. The first articulations 202 and the second articulations 204 are still driven.

Figure 2D:
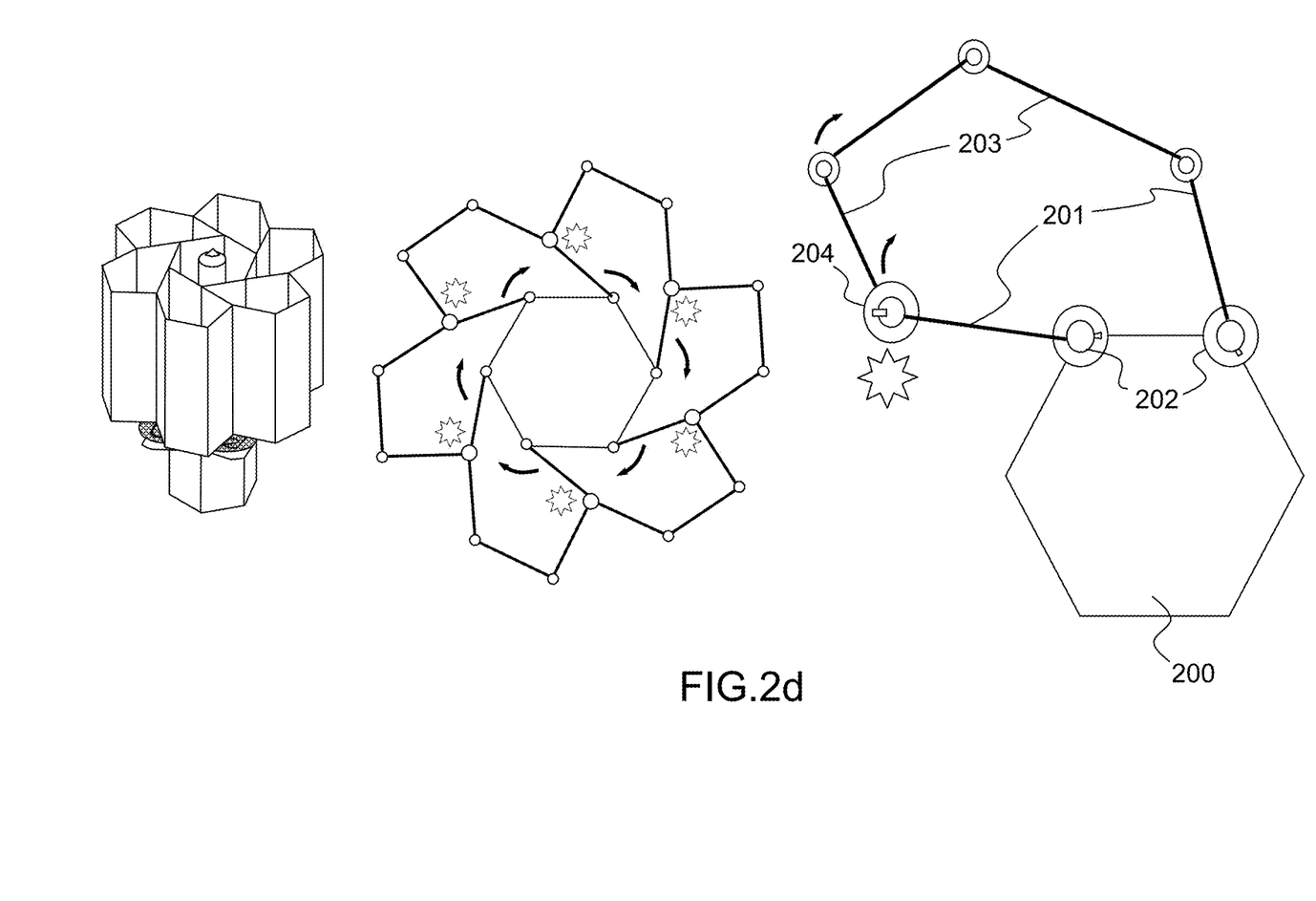

FIG. 2d represents the protection device of the invention during a third intermediate deployment step in perspective, a first view from above and a simplified second view from above showing a single cell.

During the third intermediate step, the second articulations 204 are locked when the first panels 201 and the second panels 203 are in their definitive position relative to each other, locking being symbolized by a star situated alongside the locked articulation. After they are locked, the second articulations 204 become immobile. The first panels 201 and the second panels 203 are then fastened together. The first articulations 202 are still driven.

Figure 2E:
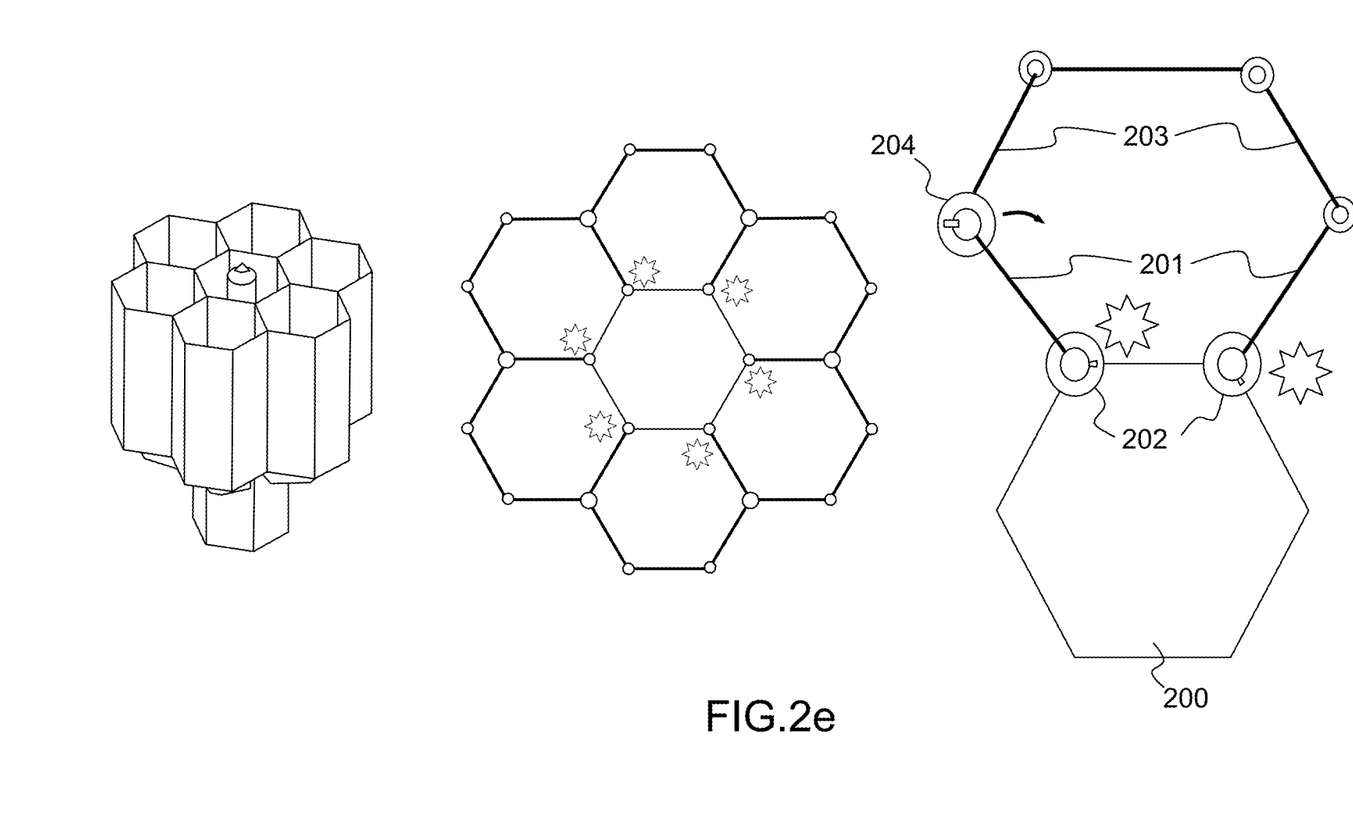

FIG. 2e represents the protection device of the invention in the deployed position in perspective, a first view from above and a simplified second view from above showing a single cell.

The first articulations 202 are then locked.

According to one feature of the invention, the protection device further includes means for retaining the panels in the folded position.

Figure 3:
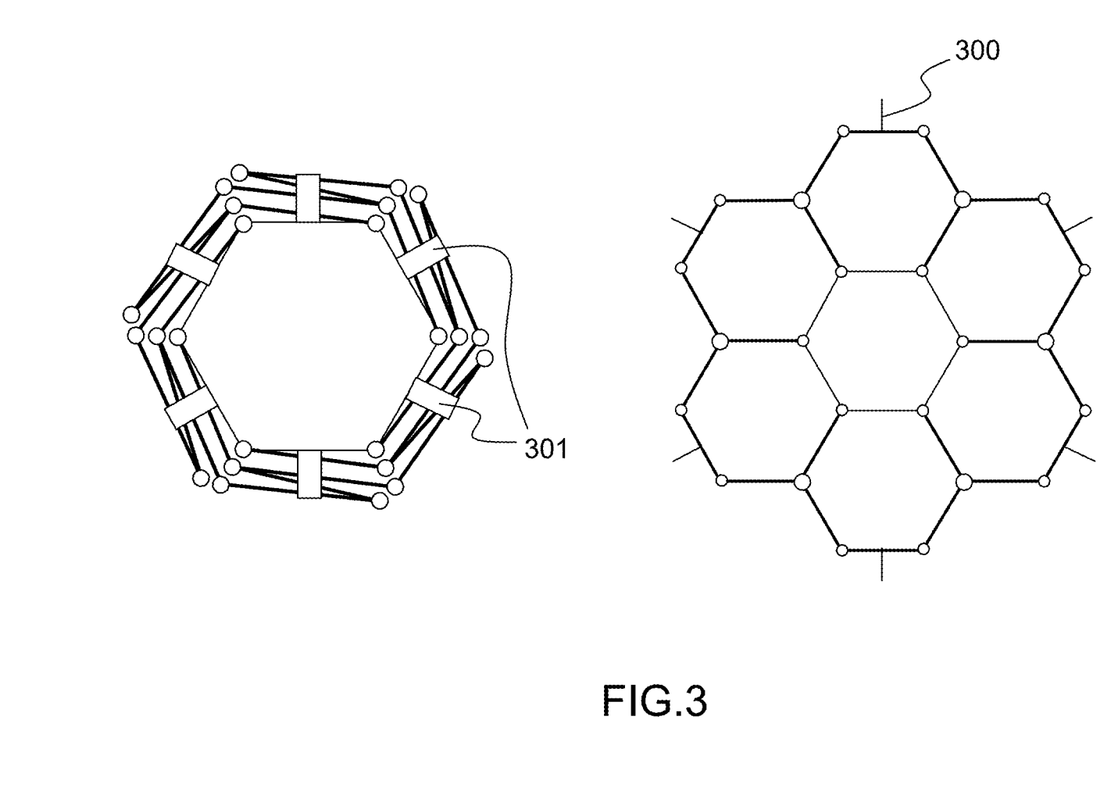
FIG. 3 represents the location of the panel retaining means in this embodiment of the invention.

FIG. 3 shows the location of the panel retaining means in the first embodiment of the invention.

In this embodiment, the retaining means include tie-rods 300 disposed for each of the cells on one of the panels of the cell and stacking bases 301 disposed on the satellite body in such a manner as to retain the tie-rods in the folded position.

In the folded position, the stowed panels are held against the body by means of the stacking bases 301 with tie-rods 300 like those used on antennas or solar generators.

In the deployed position, the tie-rods 300 are projected on the external face of the panels so as to not be in the field of view of the optical instrument. When projected on the rear face, the tie-rods block the holes through the panels and thus prevent any unwanted entry of sunlight.

The protection device advantageously further includes solar panels fixed to the panels by way of articulations, in such a manner as to be held against the panels in the folded position and to be perpendicular to the longitudinal axis of the tube in the deployed position.

Figure 4:
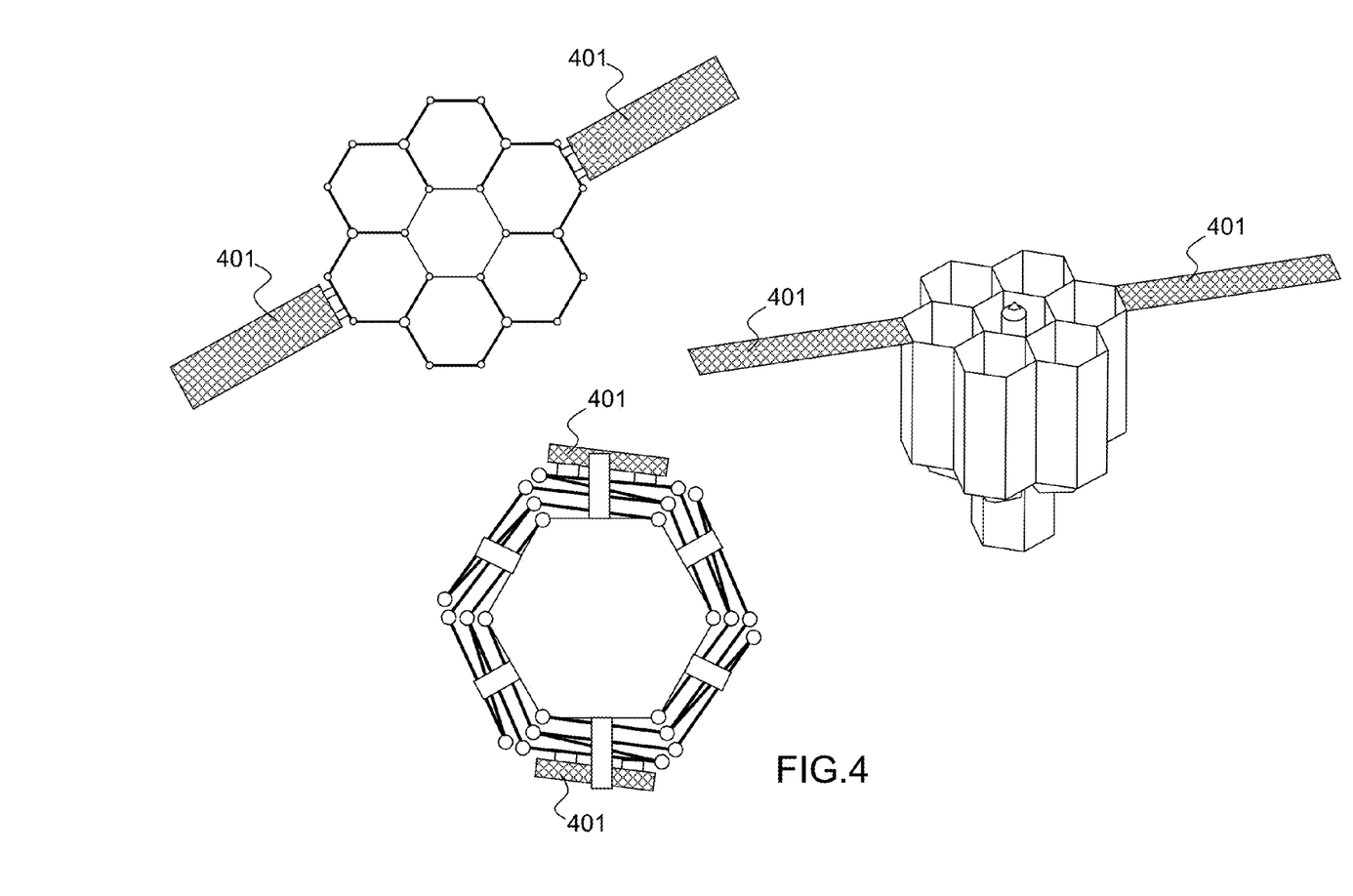
FIG. 4 represents the protection device of a different embodiment of the invention including solar generators.

FIG. 4 represents the protection device of a different embodiment of the invention including solar generators. The example shows two solar panels 401. The solar panels are thus also deployable and are stowed on the external faces of certain panels.

The articulations are situated on the opposite side of the panels 401 to the body of the satellite. The solar generators may equally be positioned at the base opposite the baffle of the telescope or in any position if stowage allows.

The articulations allow the solar panels 401 to be pivoted about an axis orthogonal to the longitudinal axis of the tubes. In the folded position, the longitudinal axis of the solar panels 401 is parallel to the longitudinal axis of the tubes. The stacking systems used for the deployable baffle panels may also be those used for the solar generator. In the deployed position, the longitudinal axis of the solar panels is perpendicular to the longitudinal axis of the tube.

In a different embodiment of the invention, the panels are solid. In a different embodiment of the invention the panels include a rigid frame to which a taut membrane is fixed.

In order to guarantee good instrument performance, the protection device may also provide the thermal control function, thanks to the addition of active and passive control elements positioned directly on the surface of the panels.

The components enabling (active and passive) thermal control are connected to a rigid substrate and are thus protected from mechanical attack in the folded position and during deployment.

The invention claimed is:

1. A protection device to protect an optical instrument of a satellite including a body on which the optical instrument is mounted, the optical instrument including a primary mirror situated in the optical instrument, a central secondary mirror positioned facing the primary mirror, and a plurality of peripheral mirrors reflecting light towards the central secondary mirror, said protection device having a folded position and a deployed position, and further comprising:
a plurality of panels rigid in the deployed position, the device forming a cellular structure including a tube for each peripheral mirror, the section of the tubes being a polygon, the tubes being disposed in such a manner as to protect the peripheral mirrors against stray illumination, and said panels being intended to be held against the body of the satellite in the folded position.

2. The protection device according to claim 1, further comprising means for retaining the panels in the folded position.

3. The protection device according to claim 1, wherein the retaining means include tie-rods disposed for each of the cells on one of the panels of the cell and stacking bases intended to be disposed on the satellite body in such a manner as to retain the tie-rods in the folded position.

4. The protection device according to claim 1, further comprising solar panels fixed to the panels by means of articulations, in such a manner as to be held against the panels in the folded position and to be perpendicular to the longitudinal axis of the tube in the deployed position.

5. The protection device according to claim 1, wherein the panels are solid.

6. The protection device according to claim 1, wherein the panels include a rigid frame to which is fixed a taut membrane.

7. The protection device according to claim 1, wherein the protection panels include active and passive control elements positioned directly on their surface, the device having a thermal control function.

8. An optical instrument including a protection device according to claim 1.

* * * * *